(12) United States Patent
Choi et al.

(10) Patent No.: US 10,449,475 B2
(45) Date of Patent: Oct. 22, 2019

(54) METHOD FOR MANUFACTURING EXPANDABLE ARTIFICIAL MEDIA FOR WATER TREATMENT BY RECYCLING WASTE LCD GLASS AND WASTE BOTTLE GLASS GENERATED FROM WASTE ELECTRIC AND ELECTRONIC PRODUCTS

(71) Applicants: Seong Pil Choi, Seoul (KR); Kyung In Choi, Seoul (KR)

(72) Inventors: Seong Pil Choi, Seoul (KR); Kyung In Choi, Seoul (KR)

( * ) Notice: Subject to any disclaimer, the term of this patent is extended or adjusted under 35 U.S.C. 154(b) by 160 days.

(21) Appl. No.: 15/568,510

(22) PCT Filed: Mar. 25, 2016

(86) PCT No.: PCT/KR2016/003040
§ 371 (c)(1),
(2) Date: Dec. 18, 2017

(87) PCT Pub. No.: WO2016/175456
PCT Pub. Date: Nov. 3, 2016

(65) Prior Publication Data
US 2018/0353886 A1  Dec. 13, 2018

(30) Foreign Application Priority Data
Apr. 27, 2015  (KR) .................. 10-2015-0058816

(51) Int. Cl.
*C03B 19/08* (2006.01)
*B01D 39/20* (2006.01)
(Continued)

(52) U.S. Cl.
CPC .......... *B01D 39/2006* (2013.01); *C02F 1/288* (2013.01); *C03B 1/00* (2013.01);
(Continued)

(58) Field of Classification Search
CPC .................................................. C03B 19/08
(Continued)

(56) References Cited

U.S. PATENT DOCUMENTS 5,350,121 A * 9/1994 Vitunac .................. B03B 9/062
241/14
5,516,351 A * 5/1996 Solomon ............... C03C 11/007
264/41

(Continued)

FOREIGN PATENT DOCUMENTS

JP      2008-115077 A    5/2008
KR   10-1998-0008166 A    4/1998
(Continued)

*Primary Examiner* — Cynthia Szewczyk
(74) *Attorney, Agent, or Firm* — Novick, Kim & Lee; Jae Youn Kim

(57) ABSTRACT

Provided is a method for manufacturing an expandable artificial media for water treatment by recycling waste liquid crystal display (LCD) glass and waste bottle glass generated from waste electric and electronic products. Therefore, the objective of the present invention is to activate the efficiency of resource circulation and energy utilization, which are green technology, and to minimize the discharge of greenhouse gases and pollutants by artificially manufacturing media for water treatment, as a filtering technique for water pollution, wherein in the artificial media manufactured by a series of automation processes, waste LCD glass and waste bottle glass are recycled through foaming. That is, the present invention reproduces artificial media by mixing, with waste bottle glass, waste LCD glass generated during a process of manufacturing or processing glass for an LCD device, or waste LCD glass disposed of after using various electronic products including an LCD monitor, such that energy can be saved by lowering the foaming calcinations temperature of waste glass and waste recycling is attempted, thereby allowing the present invention to have an environmentally friendly property of preserving limited resources.

8 Claims, 16 Drawing Sheets

(51) Int. Cl.
*C03B 1/00* (2006.01)
*C03C 11/00* (2006.01)
*C02F 1/28* (2006.01)

(52) U.S. Cl.
CPC ............ C03B 19/08 (2013.01); C03C 11/007 (2013.01); *B01D 2239/10* (2013.01); *B01D 2239/1208* (2013.01); *B01D 2239/1241* (2013.01); *B01D 2239/1291* (2013.01); *C02F 1/281* (2013.01); *C02F 1/283* (2013.01)

(58) Field of Classification Search
USPC .......................................... 65/20, 28, 134.8
See application file for complete search history.

(56) References Cited

U.S. PATENT DOCUMENTS

| | | | | |
|---|---|---|---|---|
| 5,758,832 A * | 6/1998 | Grainger | ................. | B03B 9/062 |
| | | | | 241/152.2 |
| 5,950,936 A * | 9/1999 | Bergart | ..................... | B03B 5/56 |
| | | | | 241/21 |
| 7,413,602 B2 * | 8/2008 | Grasso, Jr. | .............. | C04B 14/22 |
| | | | | 106/716 |
| 9,376,344 B2 * | 6/2016 | Ramsey | .................. | C04B 14/24 |

FOREIGN PATENT DOCUMENTS

| | | | |
|---|---|---|---|
| KR | 10-2011-0031683 A | | 3/2011 |
| KR | 10-1075069 B1 | | 10/2011 |
| KR | 10-1465227 B1 | | 11/2014 |

\* cited by examiner

METHOD FOR MANUFACTURING EXPANDABLE ARTIFICIAL MEDIA FOR WATER TREATMENT BY RECYCLING WASTE LCD GLASS AND WASTE BOTTLE GLASS GENERATED FROM WASTE ELECTRIC AND ELECTRONIC PRODUCTS

TECHNICAL FIELD

The present invention relates to a method for manufacturing an expandable artificial filter material for water treatment by recycling waste LCD glass generated from waste electric and electronic products and waste bottle glass, in which an artificial filter material for water treatment, which is a filtering technique for reducing water pollution, is manufactured via a series of automated processes by recycling waste LCD glass and waste bottle glass via foaming, whereby efficient resource circulation and energy utilization, which are green technologies, may be activated and the discharge of greenhouse gases and pollutants may be minimized.

In other words, the present invention relates to a method for reproducing an artificial filter material by mixing waste bottle glass with waste LCD glass, which is generated during a process of manufacturing or processing glass for a liquid crystal display (LCD) device, or waste LCD glass, which is disposed of after being used in various electronic products including LCD monitors, in which the foaming calcination temperature of waste glass is lowered to enable energy savings and the recycling of wastes, whereby an environmentally friendly goal of conserving limited resources may be achieved.

Accordingly, the present invention may achieve improved filtering efficiency due to very high porosity as well as greatly improved water treatment effects due to improved filtering speed, and may ensure excellent washing-ability recovery with only a small amount of power during backwashing that is performed to improve a filtering function, whereby the size of basic filtering facilities and land use thereof may be reduced, and construction costs and installation costs of supplementary facilities may be remarkably saved.

In addition, the present invention may achieve high washing efficiency and pulverizing performance due to an improved washing device and pulverizing device, wherein the respective devices are formed so as to reduce the discharge of noise to the surrounding environment while minimizing surrounding environmental pollution, and particularly, allow the mechanical setting of a furnace to be precisely and conveniently controlled during foaming and calcination, which may assist a worker in easily performing a manufacturing process and may improve the quality of an artificial filter material.

Moreover, the present invention enables packaging to be quickly and conveniently carried out via a product sorting device in consideration of the diameter (size) of an artificial filter material or the place in which the artificial filter material is used.

BACKGROUND ART

Recently, existing CRT display monitors have been rapidly replaced by LCD monitors characterized by high definition.

Such an LCD monitor is mainly composed of LCD glass and indium tin oxide (ITO). Among these, indium included in ITO is classified as a rare metal that exists in a very small amount on earth, and therefore needs to be recycled.

In addition, LCD glass, which accounts for a significant portion of the materials of an LCD monitor, should be recycled once it is discarded, but is simply incinerated or buried because the economic efficiency of recycling thereof is low due to the insufficient development of relevant technology, and significant processing costs are incurred for incineration or landfill.

Meanwhile, in the case of South Korea, which is an LCD manufacturing powerhouse, a great amount of waste LCD glass is generated in the course of production of related products by "S" company and "L" company, which have large-scale LCD production facilities. Thus, considering the arrival of the replacement cycle of domestic LCD products, the amount of waste LCD glass that is generated is expected to increase rapidly.

Therefore, measures to dispose of waste LCD glass have been proposed. According to WEEE regulations published by the European Union (EU) in early 2003, with relation to electronic products, it is stipulated that, by 2006, the recycling rate for electronic products should be 75% or more and the legal recycling rate under extended producer responsibility (EPR) should be 65% or more. In Korea, which is a strong net exporter of LCD related products, it is time to endeavor to raise the rate of recycling of waste LCD glass products in order to increase the competitiveness of production companies and national exports.

To this end, in the respective countries in the world, indium is recovered in the course of recycling waste LCD glass, or recovered materials acquired by physically or chemically treating waste LCD glass are applied to new products.

Meanwhile, lake water (reservoir water), river water, and sewage, used in water supply and drainage, contain floating matter, solids, and bacteria such as colon bacilli, generated from various foreign substances and dirt, in a precipitated or suspended form.

Thus, raw water having such a water quality cannot be used as drinking water or graywater, and requires a separate treatment process.

To this end, recently, physical and chemical treatment methods, such as an aggregation treatment method, a sand filtering method, and the like, have been widely used.

The sand filtering method has a disadvantage in that a filtering speed is slow (within a range from about $120/m^3/m^2/day$ to $150/m^3/m^2/day$) because homogenous sand has low porosity of 0.3 to 0.4.

In addition, the sand filtering method incurs excessive installation costs and a large amount of land for filtering facilities, and requires backwashing in order to restore a filtering function because sand is contaminated after a certain amount of time has passed.

However, in the sand filtering method, backwashing is not efficiently performed because the sand is heavy (having a specific gravity of about 2.5) and consumes a lot of power. In order to solve this problem, anthracite (mainly composed of sand and anthracite) has been developed and used, but confers only slight improvement in filtering speed (within a range from about $200/m^3/m^2/day$ to $300/m^3/m^2/day$) and still requires excessive installation costs and land for filtering facilities, and moreover still requires backwashing in order to restore a filtering function because it is also contaminated after a certain amount of time has passed.

Therefore, as a solution of the related art, Korean Patent Application No. 2011-0039331 (filed on 27 Apr. 2011) discloses a porous floating filter material, the technical subject of which resides in that a foam is formed using glass and is used for water treatment.

However, this related art is not a system that recycles derelict resources such as waste bottle glass (technology related to washing is not described in the corresponding publication) and is not considered a green technology, and in that there is no treatment plan for pollution, noise generation, or the like in the surrounding environment, which are caused in the processes of crushing, pulverization, mixing agitation, calcination, cooling, and sorting for the manufacture of a filter material.

DISCLOSURE

Technical Problem

As display panels of electronic products have recently been replaced by LCDs, the amount of waste LCD glass that is generated is expected to increase rapidly. However, because of the lack of technology for recycling waste LCD glass, available resources are being incinerated or buried in landfills. Therefore, a number of studies are underway to develop recycling technology for solving the problems of exhaustion of limited resources and enormous waste disposal costs and for eliminating factors that may hinder the export of electronic products by complying with the recycling rate standards of electronic products as set out in the WEEE regulations of the EU.

Thus, a first solution of the present application, which is devised to manufacture an expandable floating filter material for water treatment by recycling waste LCD glass and waste bottle glass, is to find an economical method for manufacturing a floating filter material for water treatment, which may reduce foaming and calcination costs and may increase the recycling efficiency of the domestic electronic industry so as to contribute to the overseas export industry, by mixing waste LCD glass with waste bottle glass powder, which has a relatively low foaming temperature (ranging from 710° C. to 760° C.) and foams readily, in order to eliminate the costs associated with the input of large amounts of energy for foaming and calcination of the waste LCD glass, which requires a high foaming temperature (ranging from 900° C. to 930° C.) and has high viscosity due to $Al_2O_3$.

The present application is devised to find a manufacturing method, which may increase the tensile strength, compression strength, and wear resistance of an expandable floating filter material, and consequently, may improve physical and chemical properties thereof by mixing waste LCD glass and waste bottle glass at a given ratio in consideration of the characteristics whereby $Al_2O_3$, which is contained in an excessive amount in waste LCD glass, functions to increase chemical durability, in order to prevent deterioration in the strength and durability of an existing expandable floating filter media that is manufactured by pulverizing waste bottle glass.

Accordingly, an object of the present invention is to provide an artificial filter material having high porosity, which is manufactured as an inorganic foam via foaming and calcination by recycling waste LCD glass and waste bottle glass, thus having a low specific gravity and floating well in water.

In other words, an object of the present invention is to reproduce an artificial filter material by mixing waste bottle glass with waste LCD glass, which is generated during a process of manufacturing or processing glass for a liquid crystal display (LCD) device, or waste LCD glass, which is disposed of after being used in various electronic products including LCD monitors, thereby enabling energy savings and the recycling of wastes owing to a reduction in the foaming calcination temperature of waste glass, and consequently, achieving an environmentally friendly goal of conserving limited resources.

In addition, an object of the present invention is to manufacture an artificial filter material for water treatment, which is a filtering technique for reducing water pollution, via a series of automated processes by recycling waste LCD glass and waste bottle glass via foaming, thereby activating efficient resource circulation and energy utilization, which are green technologies, and minimizing the discharge of greenhouse gases and pollutants.

In addition, an object of the present invention is to achieve improved filtering efficiency due to very high porosity as well as greatly improved water treatment effects due to improved filtering speed, and ensure excellent washing-ability recovery with only a small amount of power during backwashing that is performed to improve a filtering function, thereby reducing the size of basic filtering facilities and land use thereof and remarkably saving construction costs and installation costs of supplementary facilities.

In addition, an object of the present invention is to achieve high washing efficiency and pulverizing performance due to an improved washing device and pulverizing device, wherein the respective devices are formed so as to reduce the discharge of noise to the surrounding environment while minimizing surrounding environmental pollution, and particularly, allow the mechanical setting of a furnace to be precisely and conveniently controlled during foaming and calcination, thereby assisting a worker in easily performing a manufacturing process and improving the quality of an artificial filter material.

In addition, an object of the present invention is to enable packaging to be quickly and conveniently carried out via a product sorting device in consideration of the diameter (size) of an artificial filter material or the place in which the artificial filter material is used.

Technical Solution

In accordance with one embodiment of the present invention, there is provided a method of manufacturing an expandable artificial filter material (10) for water treatment by recycling waste LCD glass generated from waste electric and electronic products and waste bottle glass, the method including a washing step (S100) of washing collected waste LCD glass (2) and waste bottle glass (1) via a first washing device (100-1) and a second washing device (100) so as to remove foreign substances or dirt, a pulverizing step (S200) of pulverizing the washed waste LCD glass (2) and waste bottle glass to a set fine particle size via a first pulverizing device (200-1) and a second pulverizing device (200), a mixing step (S300) of mixing a foaming agent and an additive with powder of the pulverized waste LCD glass (2) and waste bottle glass so that the powder has a set specific gravity, strength and physical properties via a mixing device (300), and a foaming and calcination step (S400) of foaming a raw material powder mixture of the waste LCD glass and waste bottle glass mixed with the foaming agent and the additive while heating the mixture to a high temperature via a fire-resistant continuous furnace (400) so as to enable stabilization after foaming and calcination, wherein the expandable artificial filter material (10) has a particle size of 10 to 70 mm when used as a water treatment carrier, or a particle size of 0.3 mm to 2.5 mm when used in a filter basin, and also has a density of 0.3 g/cm$^3$ to 0.7 g/cm$^3$ in a dry state, a density of 1.0 g/cm³ to 1.4 g/cm³ in a water-saturated state, a porosity of 65% to 85%, and a compression strength of 10 kg/cm³ to 30 kg/cm³.

The first washing device (100-1) includes a water tank (110-1), a water-cooling and air-cooling washer (120-1) provided on one side of the tank, and a dryer (130-1) coupled to a remaining side of the tank and having a drain line (131-1), in order to increase efficiency of removal of various foreign substances or dirt attached and adsorbed to the waste LCD glass, and the second washing device (100) includes a drive unit (110) having a rotatable table (111), a water-cooling and air-cooling washer (120), and a dryer (130) having a drain trap (131), in order to increase efficiency of removal of various foreign substances or dirt attached and adsorbed to the waste bottle glass.

Here, the first pulverizing device (200-1) may include a box-shaped frame (210-1) having a waste LCD glass inlet (211-1) formed in one side thereof, a heavy press (220-1) provided in the frame to squeeze and pulverize the plate-shaped washed waste LCD glass (2) to a size of 40 μm to 100 μm via vertical movement thereof relative to the waste LCD glass (2), a dust collector (220-1) provided in the frame (210-1) to collect dust of the waste LCD glass (2) generated during pulverizing, and an anti-noise sound absorber (230-2) coupled to an outer circumferential surface of the frame, and the second pulverizing device (200) may include a rotor (221) or fine media (222) accommodated in a pulverizing tank (210) to finely pulverize the washed waste bottle glass to a size of 100 μm to 200 μm via rotation thereof, a dust collector 230 formed in one side of the pulverizing tank 210, and an anti-noise sound absorber (240) formed on an outer circumferential surface of the pulverizing tank 210.

In the mixing step (S300), the foaming agent may be any one of calcium carbonate, carbon black, and sodium carbonate, or a combination obtained by selective coupling thereof, and the additive may be clay or a component having characteristics equivalent to those of clay.

Here, in the mixing step (S300), waste LCD glass powder in an amount of 20 to 50 parts by weight, calcium carbonate in an amount of 3.0 to 5.0 parts by weight, carbon black in an amount of 0.05 to 2.0 parts by weight, and sodium carbonate in an amount of 2.5 to 6.0 parts by weight may be added to the pulverized waste bottle glass powder in an amount of 100 parts by weight, and when improvement (increase) in a physical property of the artificial filter material is required via adjustment of a specific gravity and strength thereof, clay in an amount of 2.0 to 5.0 parts by weight may be mixed and hardened so that the pulverized waste bottle glass powder has a density of 1.1 g/cm³ to 2.0 g/cm³ before the powder is pressed and loaded into the continuous furnace (400).

In the foaming and calcination step (S400), the continuous furnace (400) may include an automatic temperature adjustment device (410), which increases an inner heating temperature to 650° C. to 1200° C. in a set section from an inlet of the furnace, and immediately after foaming and calcination, decreases the temperature to 400° C. to 500° C., so as to enable annealing for stabilization of a foam, removal of a residual inner stress and prevention of cracks.

Here, in the foaming and calcination step (S400), the continuous furnace 400 may further include a conveyor belt (420) having a speed adjustment device (421) to control a set speed based on the introduced raw material powder mixture of the waste bottle glass, the conveyor belt (420) being formed of a stainless-based metal material having high heat resistance, a protective net (430) provided under the conveyor belt (420) to prevent the raw material powder mixture of the waste bottle glass from scattering or dispersing to a floor, a rotation roller (440) formed of titanium or tungsten and configured to drive the conveyor belt (420), and a cooling chamber (450) configured to continuously cool the conveyor belt (420) and the roller (440) using circulation of water.

The method may further include, after the foaming and calcination step (S400), a packaging step (S500) of crushing and pulverizing the artificial filter material (10) to a predetermined size using a crusher (510), and thereafter, sorting and packaging the artificial filter material into the respective sizes via a product sorting device (500) having a mesh (520).

Here, the product sorting device (500) may be provided on one side thereof with the multistage mesh (520) to sort the foamed artificial filter material (10) so that the filter material crushed to a size of 10 mm to 70 mm by the crusher (510) is used as a water treatment carrier, or so that the filter material crushed to a size of 0.3 mm to 2.5 mm is used in a filter basin for treatment of drinking water, graywater, or sewage water, and may also be provided on a remaining side thereof with a dust collecting member (530) to collect dust generated during sorting.

Advantageous Effects

As is apparent from the above description, through a method for manufacturing an expandable floating filter material for water treatment by recycling waste LCD glass and waste bottle glass according to the present invention, by providing waste LCD glass, most of which has been incinerated or buried in landfills because of the lack of technology for recycling waste LCD glass, as a raw material required for the manufacture of the expandable floating filter material for water treatment, it is possible to increase efficiency of recycling of waste LCD glass generated from electronic products so as to recycle limited resources, which meet the resource circulation policy of the government, and to achieve economical effects such as a reduction in waste processing costs.

In addition, it is possible to secure export competitiveness by complying with the recycling requirements of electronic products as set out in the WEEE regulations of the EU, which are emerging as an impediment to the domestic electronics industry, which is developing into an export strategy industry.

In addition, through the method for manufacturing the expandable floating filter material for water treatment by recycling waste LCD glass and waste bottle glass described above, it is possible to develop technology for manufacturing an expandable floating filter material for water treatment having excellent tensile strength, compression strength, and wear resistance by appropriately harmonizing characteristics provided by the structure of borate glass of waste LCD glass and the structure of soda lime glass of waste bottle glass, thereby propagating the manufacture technology capable of supplying a high-quality expandable floating filter material to the domestic water treatment industry, which may develop the domestic water treatment industry one step further.

According to the present invention, as a result of manufacturing an artificial filter material for water treatment, which is a filtering technique for reducing water pollution, via a series of automated processes by recycling waste LCD glass and waste bottle glass via foaming, it is possible to activate efficient resource circulation and energy utilization, which are green technologies and to minimize the discharge of greenhouse gases and pollutants.

In other words, according to the present invention, as a result of reproducing an artificial filter material by mixing waste bottle glass with waste LCD glass, which is generated during a process of manufacturing or processing glass for a liquid crystal display (LCD) device, or waste LCD glass, which is disposed of after being used in various electronic products including LCD monitors, it is possible to enable energy savings and the recycling of wastes owing to a reduction in the foaming calcination temperature of waste glass, and consequently, achieve an environmentally friendly goal of conserving limited resources.

According to the present invention, it is possible to achieve improved filtering efficiency due to very high porosity as well as greatly improved water treatment effects due to improved filtering speed, and to ensure excellent washing-ability recovery with only a small amount of power during backwashing that is performed to improve a filtering function, whereby the size of basic filtering facilities and land use thereof may be reduced and the construction costs and installation costs of supplementary facilities may be remarkably saved.

Here, it is possible to achieve high washing efficiency and pulverizing performance due to an improved washing device and pulverizing device, wherein the respective devices are formed so as to reduce the discharge of noise to the surrounding environment while minimizing surrounding environmental pollution, and particularly, allow the mechanical setting of a furnace to be precisely and conveniently controlled during foaming and calcination, which may assist a worker in easily performing a manufacturing process and improve the quality of an artificial filter material.

In addition, according to the present invention, it is possible to enable packaging to be quickly and conveniently carried out via a product sorting device in consideration of the diameter (size) of an artificial filter material or the place in which the artificial filter material is used.

DESCRIPTION OF REFERENCE NUMERALS

Figure 1:
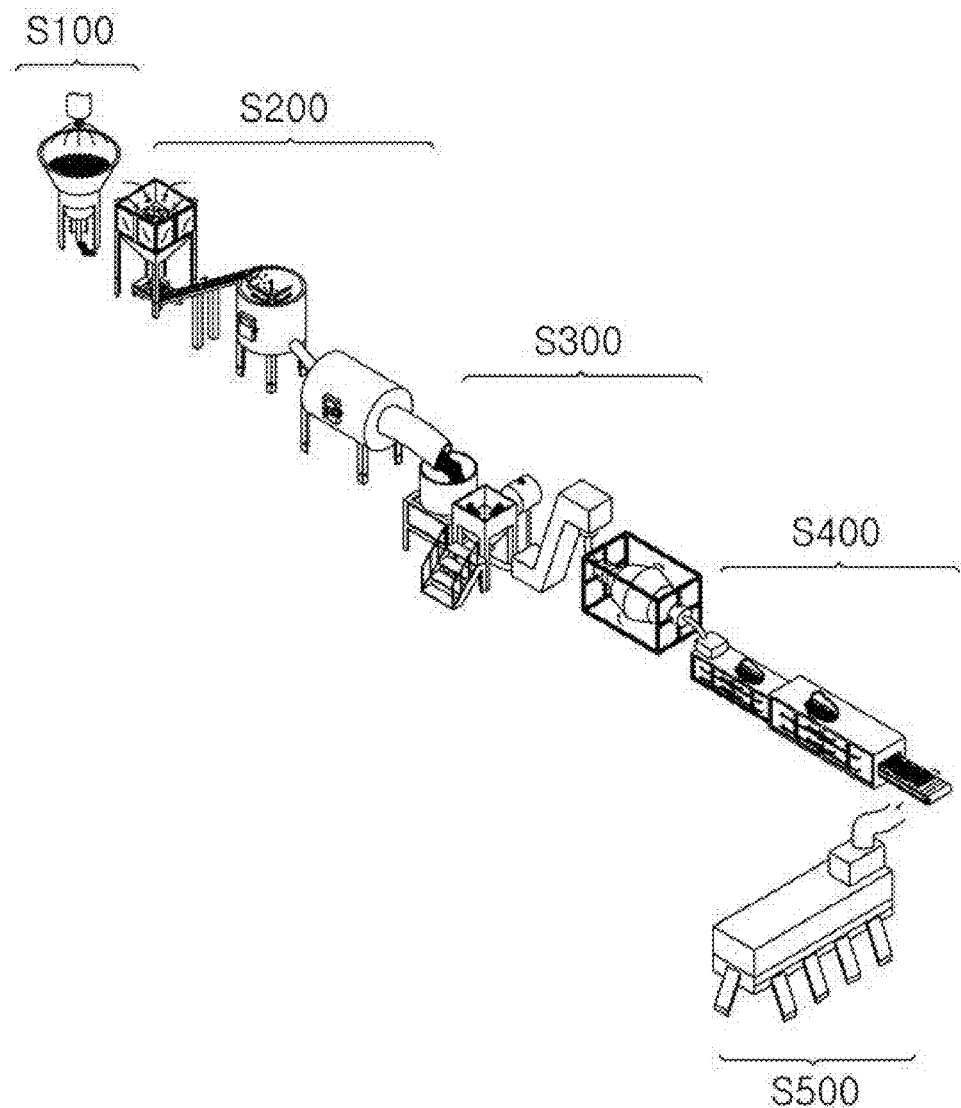
FIG. 1 is an exemplary view illustrating devices for respective manufacturing steps according to the present invention, which are arranged in a line.
Figure 2:
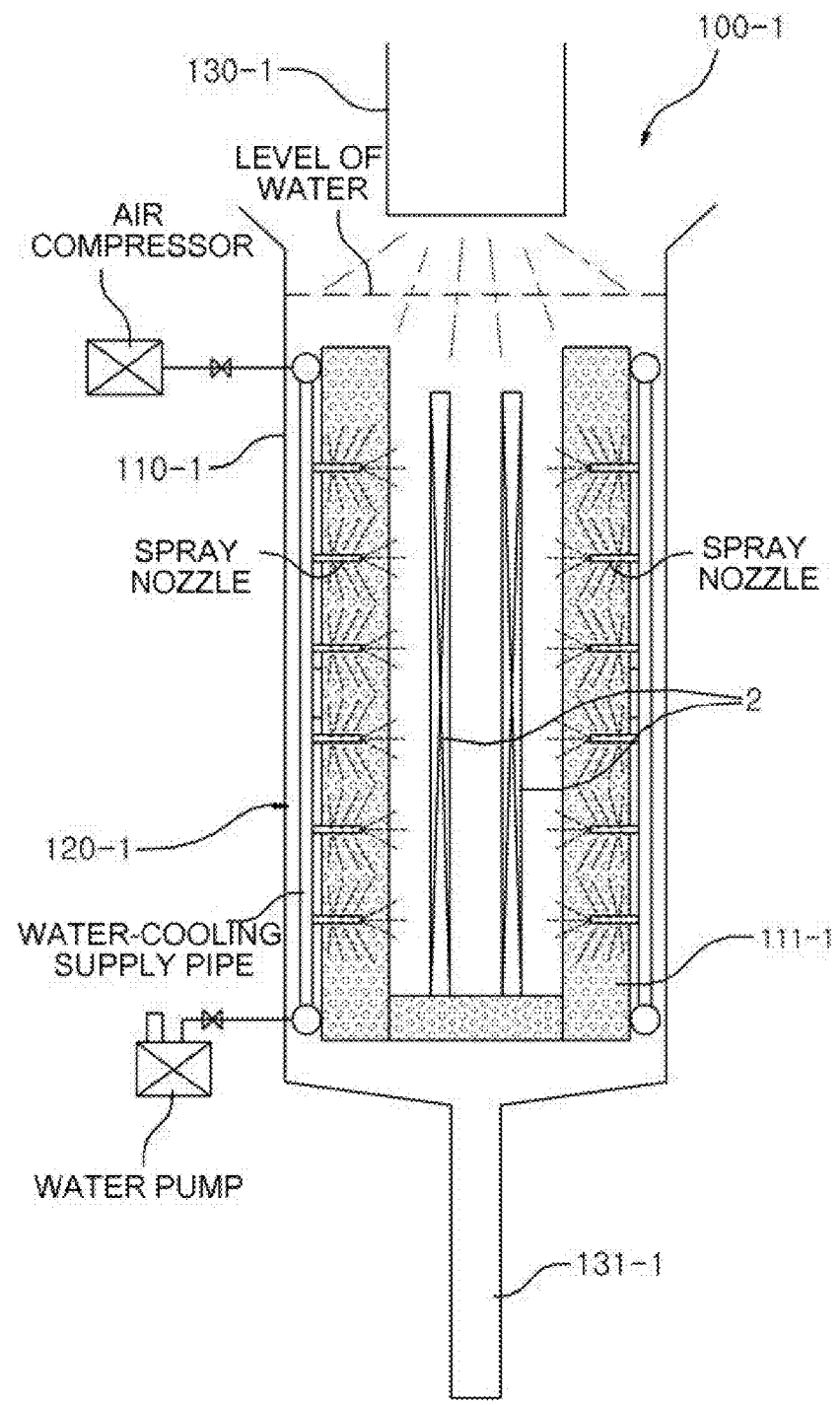
FIGS. 2 to 4 are exemplary views illustrating washing devices according to the present invention.

| 1: waste bottle glass | 2: waste LCD glass |
|---|---|
| 10: artificial filter material | |
| 100-1: first washing device | |
| 100: second washing device | 200: pulverizing device |
| 300: mixing device | |
| 400: foaming and calcination device | |
| 500: product sorting device | |

BEST MODE

To achieve the objects described above, the present invention provides a method of manufacturing an expandable artificial filter material (10) for water treatment by recycling waste LCD glass generated from waste electric and electronic products and waste bottle glass, the method including a washing step (S100) of washing collected waste LCD glass (2) and waste bottle glass (1) via a first washing device (100-1) and a second washing device (100) so as to remove foreign substances or dirt, a pulverizing step (S200) of pulverizing the washed waste LCD glass (2) and waste bottle glass to a set fine particle size via a first pulverizing device (200-1) and a second pulverizing device (200), a mixing step (S300) of mixing a foaming agent and an additive with powder of the pulverized waste LCD glass (2) and waste bottle glass so that the powder has a set specific gravity, strength and physical properties via a mixing device (300), and a foaming and calcination step (S400) of foaming a raw material powder mixture of the waste LCD glass and waste bottle glass mixed with the foaming agent and the additive while heating the mixture to a high temperature via a fire-resistant continuous furnace (400) so as to enable stabilization after foaming and calcination, wherein the expandable artificial filter material (10) has a particle size of 10 to 70 mm when used as a water treatment carrier, or a particle size of 0.3 mm to 2.5 mm when used in a filter basin, and also has a density of 0.3 g/cm$^3$ to 0.7 g/cm$^3$ in a dry state, a density of 1.0 g/cm$^3$ to 1.4 g/cm$^3$ in a water-saturated state, a porosity of 65% to 85%, and a compression strength of 10 kg/cm$^3$ to 30 kg/cm$^3$.

MODE FOR INVENTION

Next, the present invention will be described in more detail with reference to the accompanying drawings.

Figure 15:
FIG. 15 is a photograph illustrating an expandable artificial filter material according to the present invention.
Figure 16:
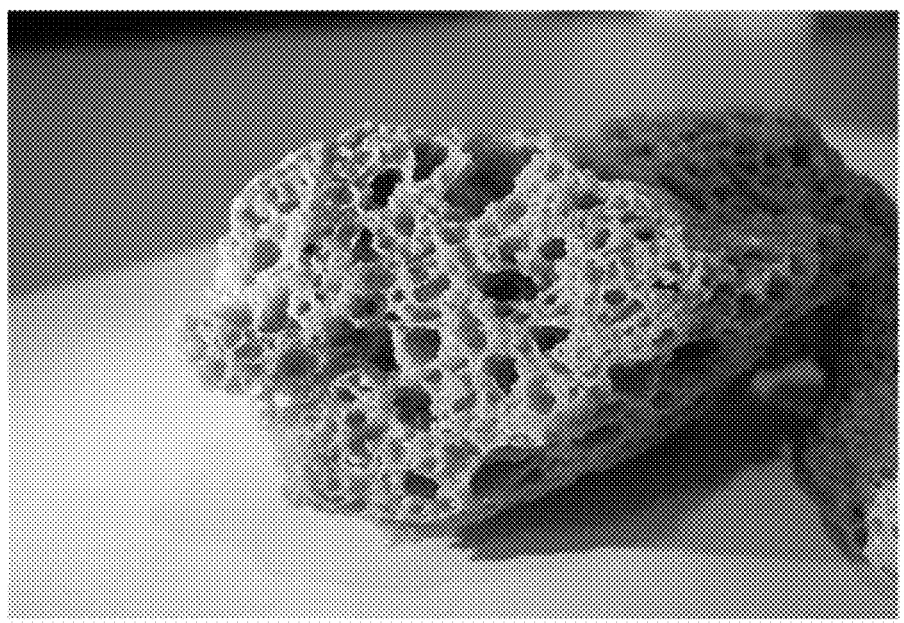
FIG. 16 is a photograph illustrating a water treatment carrier manufactured using the expandable artificial filter material of FIG. 15.
Figure 17:
FIG. 17 is a photograph illustrating a filter material for a filter basin manufactured using the expandable artificial filter material of FIG. 15.

First, as illustrated in FIGS. 15 to 17, the present invention relates to an expandable artificial filter material 10 that is manufactured by recycling waste LCD glass 2 and waste bottle glass 1. When the artificial filter material is to be used as a water treatment carrier, it is manufactured to have a particle size of 10 mm to 70 mm. When the artificial filter material is to be used in a filter basin, it is manufactured to have a particle size of 0.3 mm to 2.5 mm. The artificial filter material has a density of 0.3 g/cm$^3$ to 0.7 g/cm$^3$ in a dry state, a density of 1.0 g/cm$^3$ to 1.4 g/cm$^3$ in a water-saturated state, a porosity of 65%-85%, and a compression strength of 10 kg/cm$^3$ to 30 kg/cm$^3$.

In addition, a method for manufacturing the artificial filter material according to the present invention basically includes a washing step, a pulverizing step, a mixing step, and a foaming and calcination step, as illustrated in FIG. 1.

In the washing step S100, the collected waste LCD glass 2 and waste bottle glass 1 are washed via first and second washing devices 100-1 and 100 so as to remove foreign substances and dirt therefrom.

Here, the first washing device 100-1 includes a water tank 110-1, a water-cooling and air-cooling washer 120-1 provided on one side of the tank, and a dryer 130-1 having a drain line 131-1 provided on the other side thereof, in order to increase efficiency of removal of various foreign substances or dirt attached and adsorbed to the waste LCD glass.

The water-cooling and air-cooling washer includes a "U"-shaped mesh block inside a hopper, and a water-cooling supply pipe is provided between the mesh block and the hopper and is connected to a water pump and an air compressor. The water-cooling supply pipe is provided with a plurality of branch pipes having spray nozzles so that high-pressure water is sprayed in a scattered state onto the waste LCD glass so as to remove stubborn stains.

At this time, a wash liquid and wash air may be supplied to the waste LCD glass at the same time, or may be supplied in sequence such that the air is supplied after stains on the waste LCD glass immersed below a level of the water in the hopper are soaked, so as to enable washing of pollutants in a bubble-jet form (and/or a water-jet form).

At this time, the dryer provided at an upper position performs washing using water and then drying using high-pressure air when the supplied water is discharged through the drain line. Here, the dryer is connected to the water pump and the air compressor through a line so as to selectively spray the wash water and the air.

Figure 3:
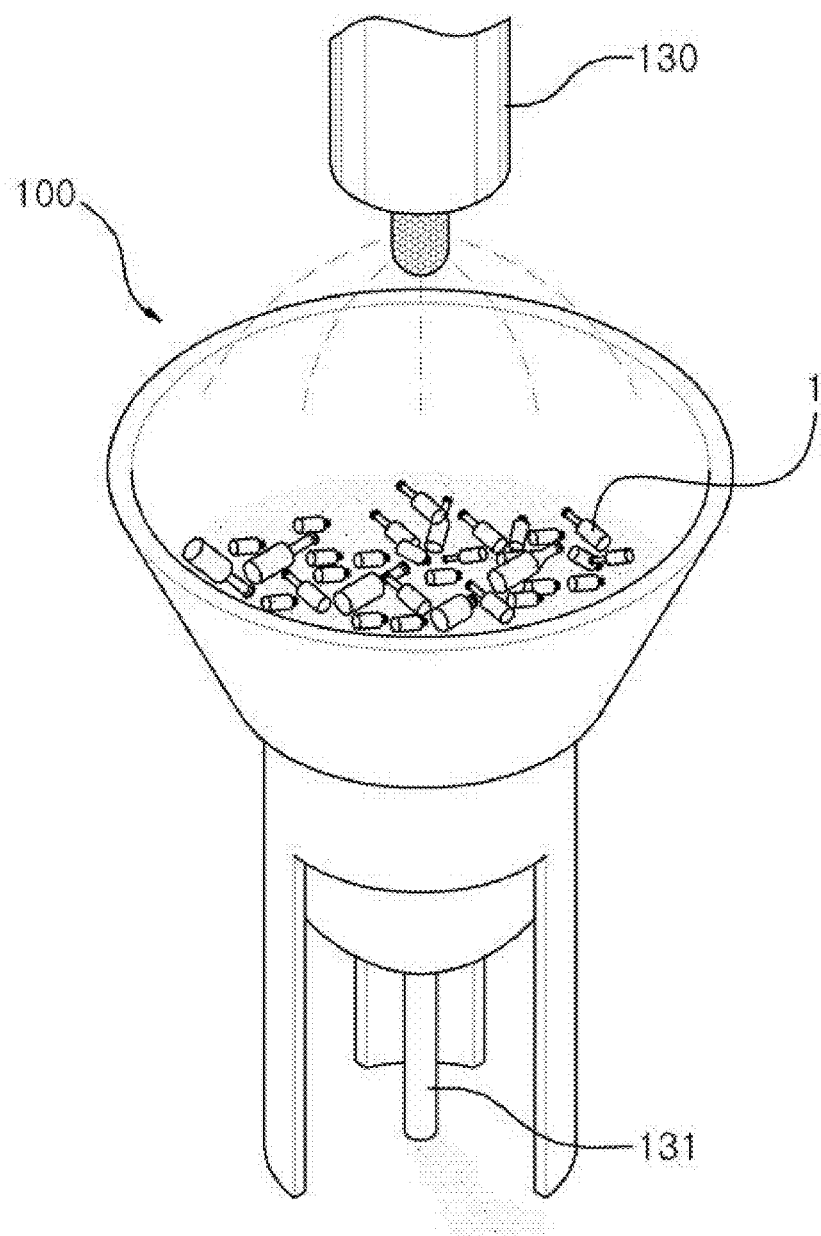
Figure 4:
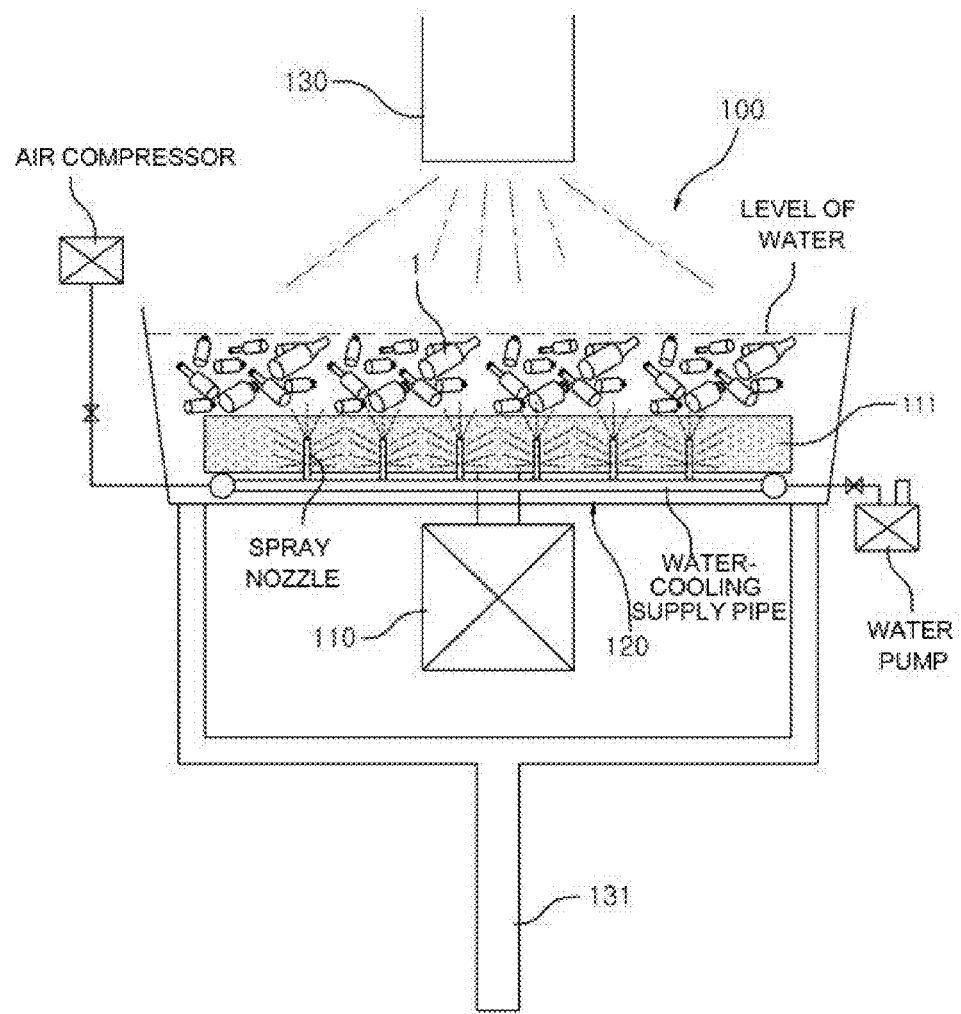
Figure 5:
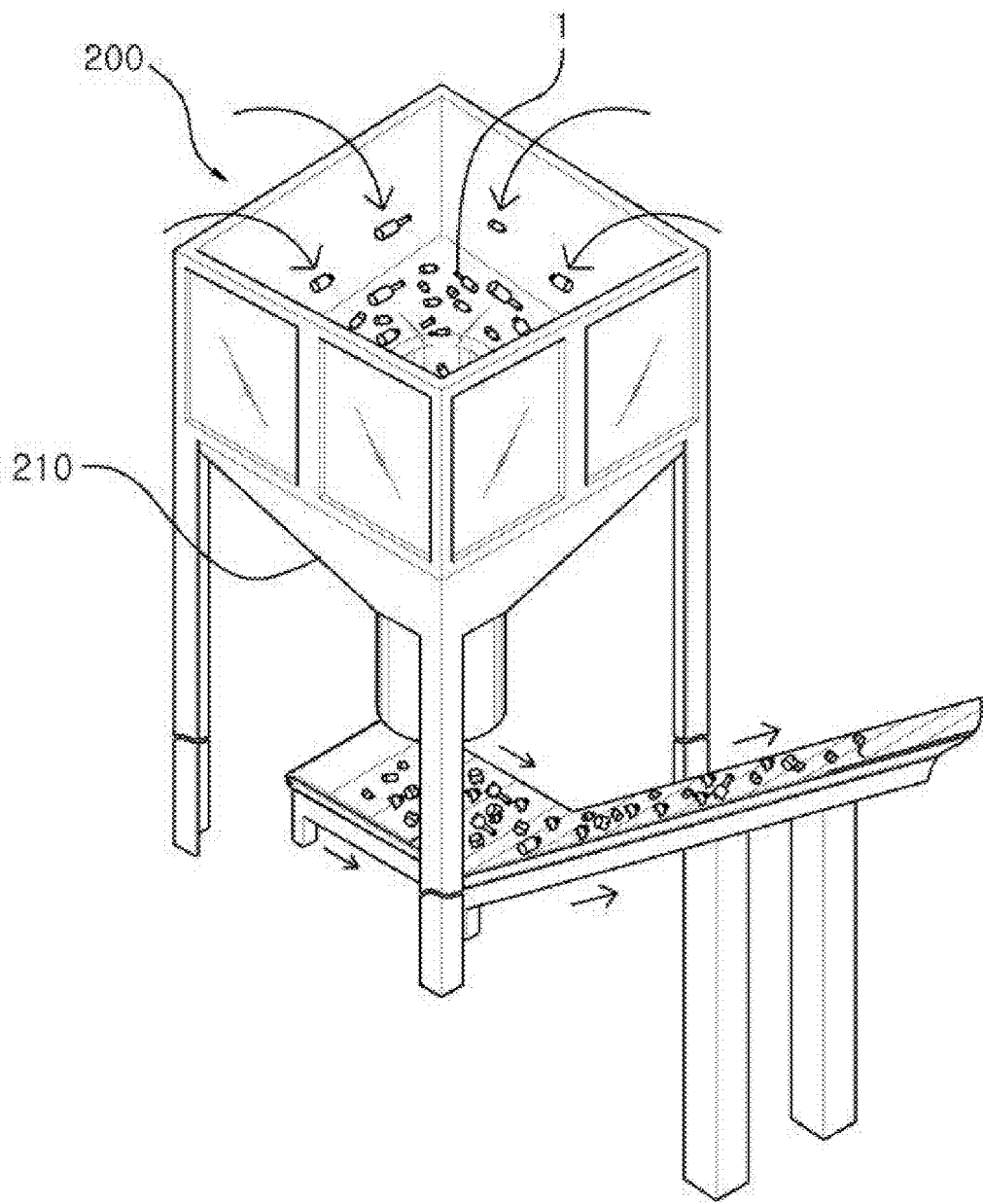
FIGS. 5 to 10 are exemplary views illustrating pulverizing devices according to the present invention.

As illustrated in FIGS. 3 and 4, the second washing device 100 includes a drive unit 110 having a rotatable table 111, a water-cooling and air-cooling washer 120, and a dryer 130 having a drain trap 131, in order to increase efficiency of removal of various foreign substances or dirt attached and adsorbed to the waste bottle glass.

The water-cooling and air-cooling washer is configured to primarily wash the waste bottle glass using a water pump provided outside a hopper. The water pump is configured to selectively supply cold water in summer and hot water in winter. Depending on setting, water may fill the hopper up to the open upper end thereof until the waste bottle glass is immersed in the water so that stubborn stains inside and outside the waste bottle glass are soaked.

The water-cooling and air-cooling washer includes a water-cooling supply pipe, which is connected to the water pump and provided with a plurality of branch pipes having spray nozzles so as to enable high-pressure washing in a water-jet form.

In addition, one side of the water-cooling supply pipe communicates with an air line of an air compressor so that high-pressure air is supplied at a predetermined cycle to the water-cooling supply pipe to enable smooth removal of stubborn stains via spraying of air bubbles in a bubble-jet form.

Here, the rotatable table is rotated in a circumferential direction by the drive unit to assist uniform washing.

In addition, the dryer is connected to the water pump and the air compressor and is configured to initially spray water from a top to a bottom and, after the water used for washing is completely discharged through the drain trap, again spray rinsing water, and thereafter spray high-pressure air from the air compressor so as to enable smooth washing (the washing may be performed according to the same concept as in the first washing device).

In other words, this serves to perform washing more precisely than in the related art, thereby increasing foaming performance through the complete removal of impurities.

Next, in the pulverizing step S200, the washed waste LCD glass 2 and waste bottle glass 1 are pulverized to a preset fine particle size via first and second pulverizing devices 200-1 and 200, as illustrated in FIGS. 5 to 10.

Figure 6:
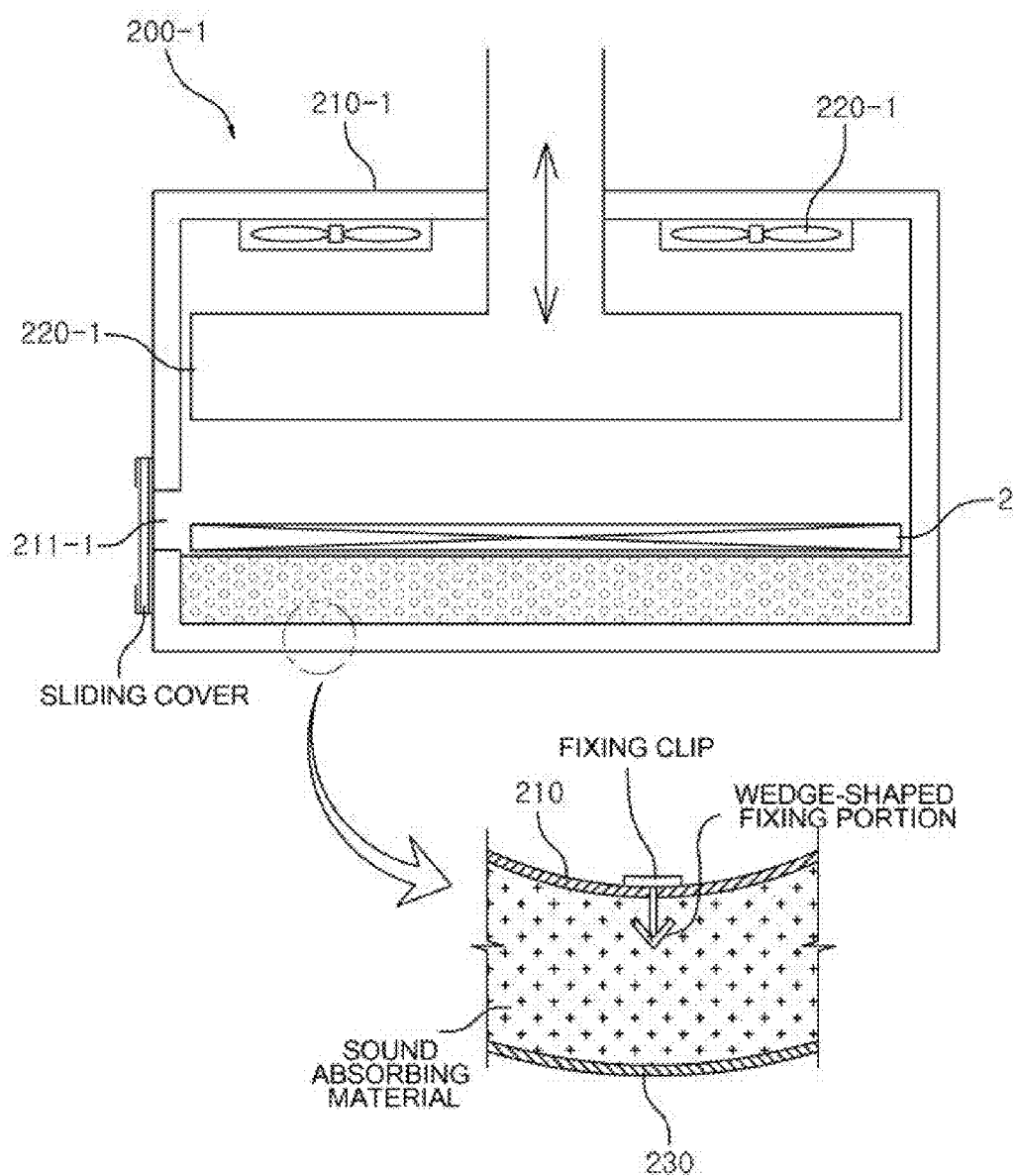
Figure 7:
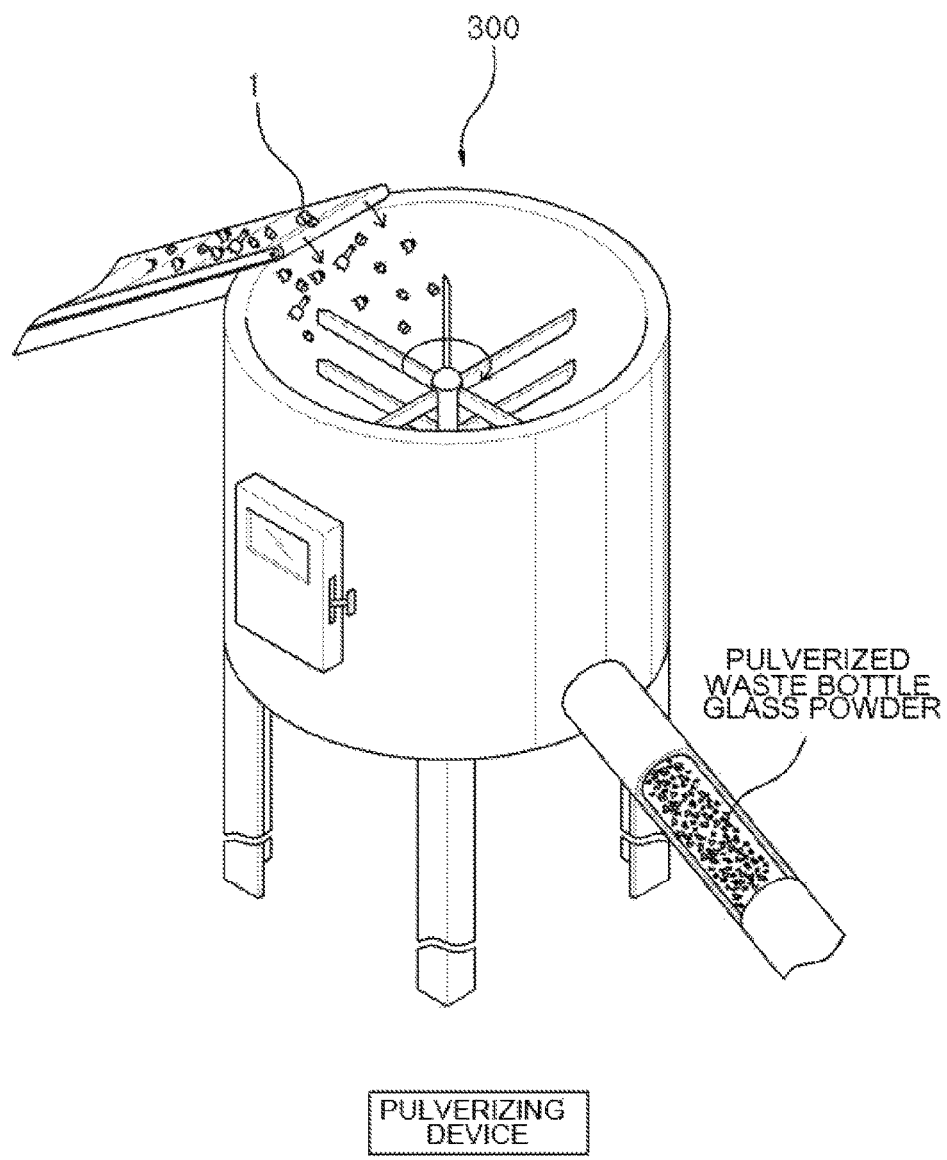

As illustrated in FIG. 6, the first pulverizing device 200-1 includes a heavy press 220-1, which is configured to squeeze and pulverize the plate-shaped washed waste LCD glass to a size of 40 µm to 100 µm via vertical movement thereof relative to the waste LCD glass 2. The press 220-1 is provided in a box-shaped frame 210-1 having a waste LCD glass inlet 211-1 formed in one side thereof. A dust collector 220-1 is further provided inside the frame 210-1 to collect dust generated when the waste LCD glass 2 is pulverized, and an anti-noise sound absorber 230-2 is coupled to the outer circumferential surface of the frame.

Figure 8:
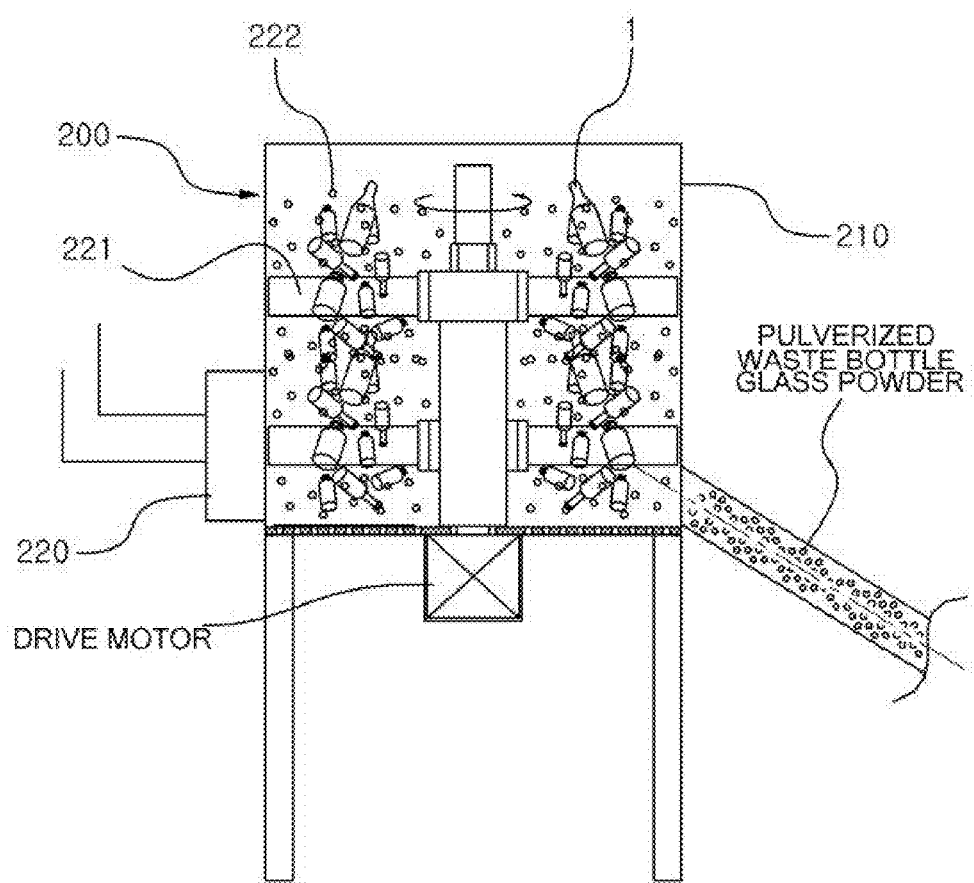
Figure 9:
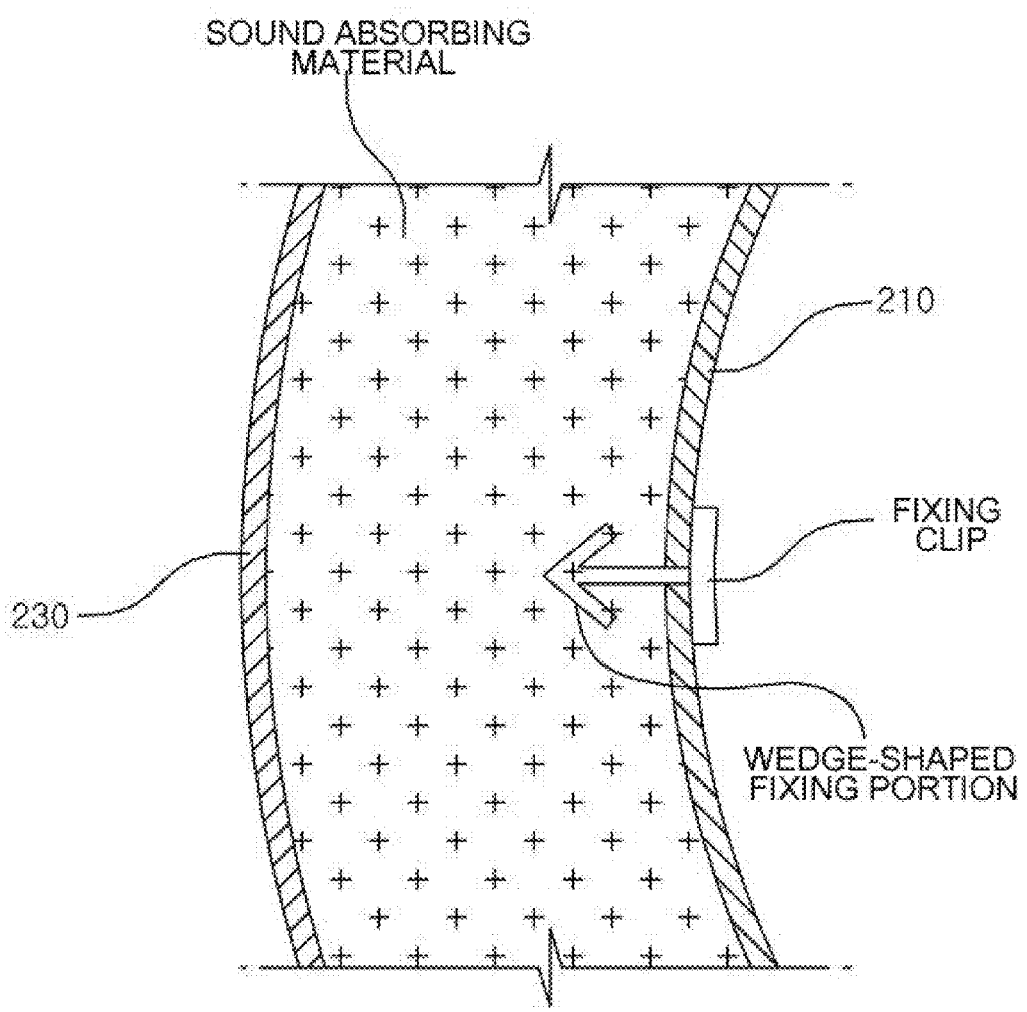
Figure 10:
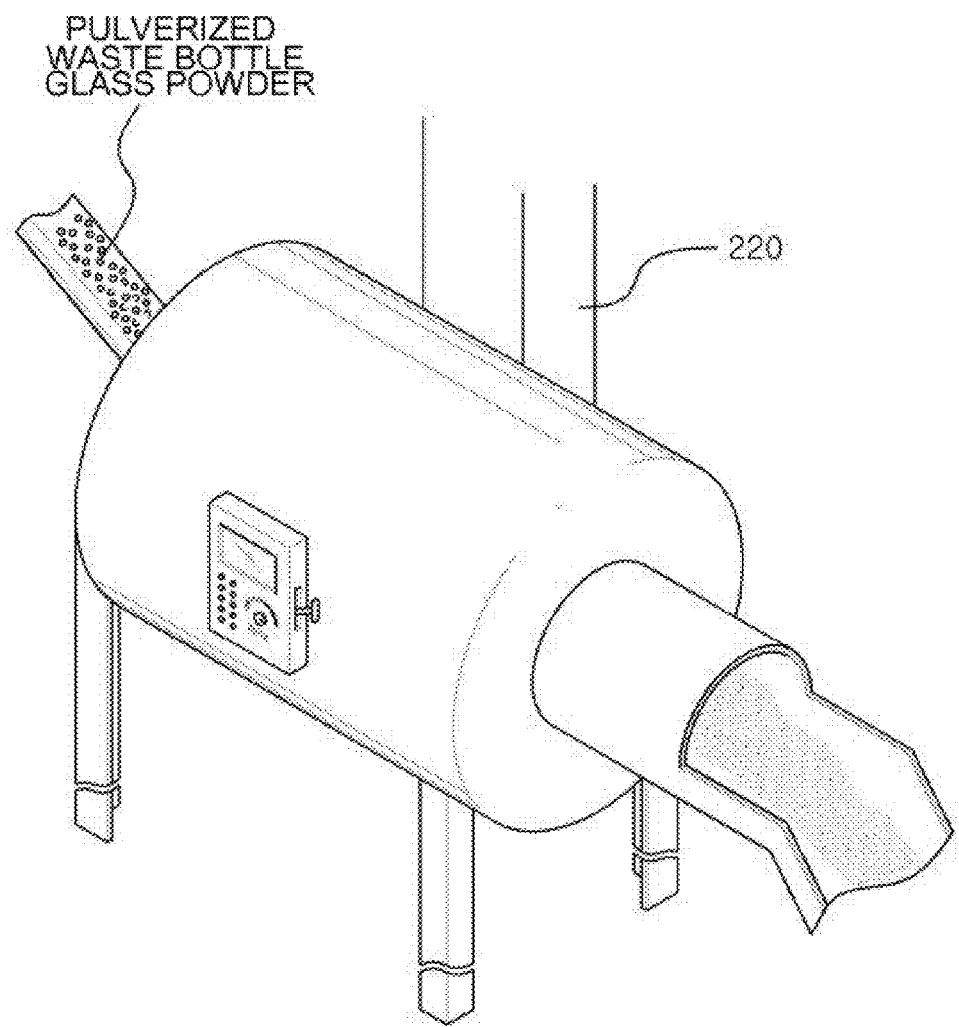

As illustrated in FIGS. 8 to 10, the pulverizing device 200 includes rotors 221 or fine media 222, which are mounted in a pulverizing tank 210 thereof to pulverize the washed waste bottle glass to a fine size of 100 µm to 200 µm via rotation thereof. A dust collector 230 is provided on one side of the pulverizing tank 210, and an anti-noise sound absorber 240 is formed on the outer circumferential surface of the pulverizing tank 210.

The pulverizing tank is provided with a Teflon coating on the inner circumference thereof, in order to minimize damage to the pulverizing tank due to debris of broken waste bottle glass.

In addition, the rotors or the fine media serve to pulverize the waste bottle glass to a preset size (within a range of about 1 $cm^2$ to 5 $cm^2$). Specifically, multiple rotors (impellers) are radially branched from an upright shaft in a vertical longitudinal direction, and in order to increase pulverizing force during rotation, fine media in the form of iron beads are rotated therewith so as to pulverize the waste bottle glass.

Thereafter, the primarily pulverized waste bottle glass is further finely pulverized to a size of 100 µm to 200 µm while passing through a drum-type fine pulverizing device.

Here, in the fine pulverizing device, a shaft is provided in the left-and-right direction (or the longitudinal direction) so that the waste bottle glass is pulverized to a size of 100 µm to 200 µM by the rotors or the fine media.

The dust collector is provided on one side of the pulverizing tank and is configured to collect and dispose of dust generated during pulverization.

The sound absorber is formed by forming the pulverizing tank into a double-pipe form and filling the space between the double pipes with a sound absorbing material to prevent the outward discharge of noise.

Here, upon construction of the sound absorbing material, after multiple fixing clips each having a wedge-shaped fixing portion are attached to an inner hollow pipe among the double pipes, the outer hollow pipe is coupled and fixed via welding so as to fix the sound absorbing material.

This serves to prevent the sound absorbing material from falling due to the weigh thereof, causing a deterioration in sound absorption efficiency.

Figure 11:
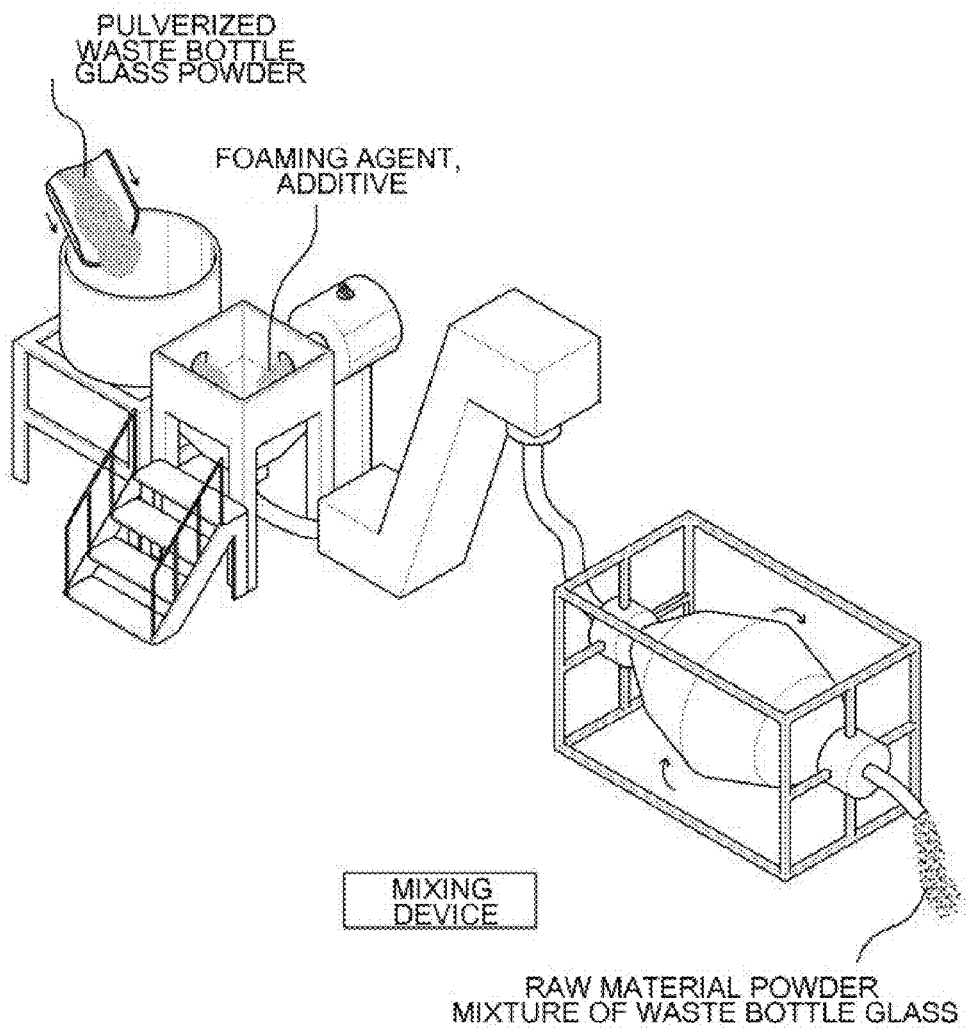
FIG. 11 is an exemplary view illustrating a mixing device according to the present invention.

Next, in the mixing step S300, as illustrated in FIG. 11, the mixing device 300 mixes a foaming agent and an additive with powder of the pulverized waste LCD glass 2 and waste bottle glass so that the powder has a preset specific gravity, strength, and physical properties. Here, in the mixing step S300, the foaming agent is formed of any one of calcium carbonate, carbon black, sodium carbonate, or a combination acquired via selective coupling thereof, and the additive is formed of clay or any other component having characteristics equivalent to those of clay.

Specifically, in the mixing step S300, waste LCD glass powder in an amount of 20 to 50 parts by weight, calcium carbonate in an amount of 3.0 to 5.0 parts by weight, carbon black in an amount of 0.05 to 2.0 parts by weight, and sodium carbonate in an amount of 2.5 to 6.0 parts by weight are added to the pulverized waste bottle glass powder in an amount of 100 parts by weight. When improvement (increase) of physical properties is desired depending on the specific gravity and strength of the artificial filter material, clay in an amount of 2.0 to 5.0 parts by weight is mixed and hardened so that the density of the powder of the pulverized waste bottle glass becomes 1.1 g/cm$^3$ to 2.0 g/cm$^3$. Thereafter, the powder is pressed and loaded into a continuous furnace 400.

Next, in the foaming and calcination step S400, a raw material powder mixture of the waste LCD glass 2 and waste bottle glass, which is mixed with the foaming agent and the addictive, is heated to a high temperature via the continuous furnace 400 having a fire-resistant structure, which ensures stabilization of the powder after foaming and calcination.

Figure 12:
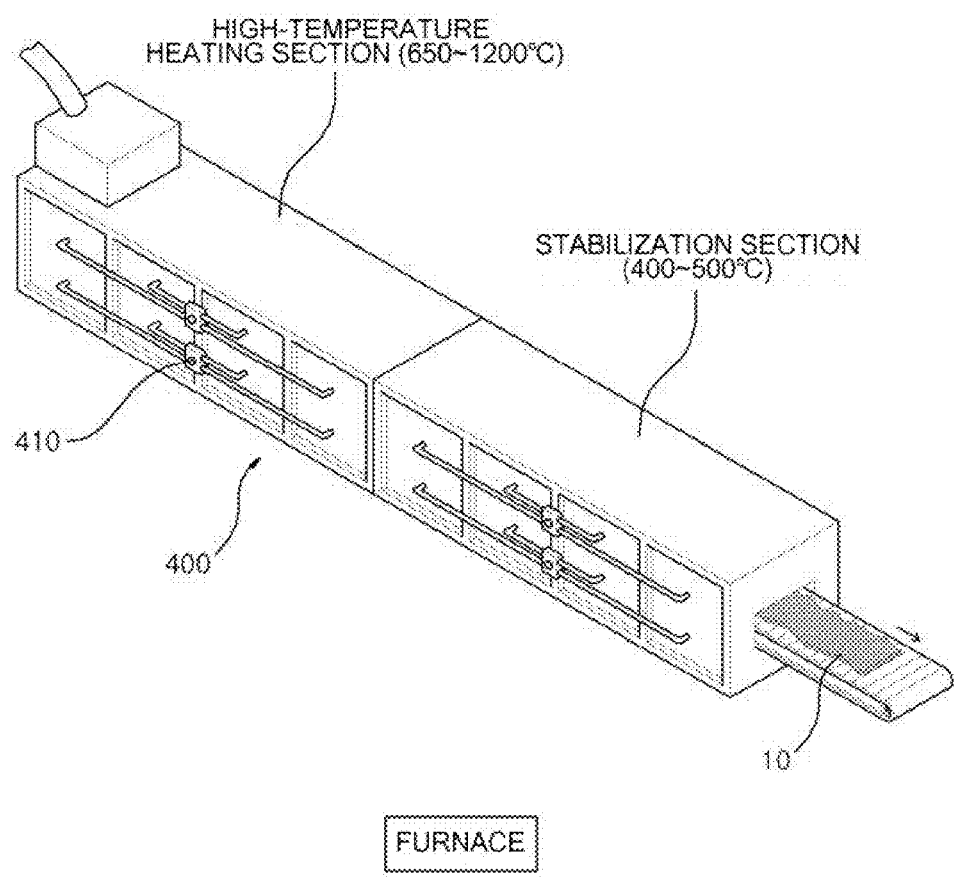
FIGS. 12 and 13 are exemplary views illustrating a furnace for a foaming and calcination step according to the present invention.
Figure 13:
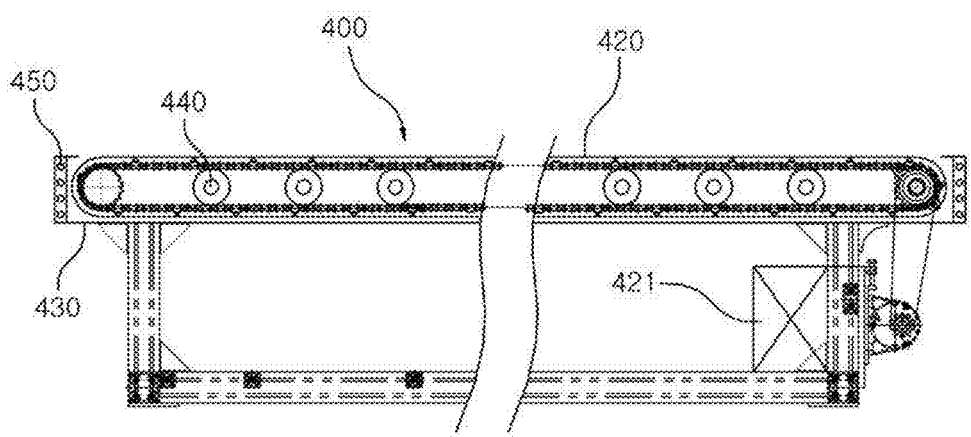

Specifically, in the foaming and calcination step S400, as illustrated in FIGS. 12 and 13, through the use of an automatic temperature adjustment device 410 provided on the continuous furnace 400, the inner heating temperature in a set section from the inlet of the furnace reaches 650° C. to 1200° C., and immediately after foaming, the temperature is lowered to 400° C. to 500° C. so as to enable annealing for stabilizing the resulting foam and to prevent the generation of cracks by removing residual stress.

Here, the continuous furnace 400 used in the foaming and calcination step S400 includes a conveyor belt 420 having a speed adjustment device 421 to control a set speed based on the introduced raw material powder mixture of the waste LCD glass 2 and the waste bottle glass. The conveyor belt 420 is formed of a stainless-based metal material having high heat resistance. In addition, a protective net 430 is provided under the conveyor belt 420 to prevent the raw material powder mixture of the waste LCD glass 2 and the waste bottle glass from scattering or dispersing to a floor. A rotation roller 440 formed of titanium or tungsten is provided to drive the conveyor belt 420, and a cooling chamber 450 is provided to continuously cool the conveyor belt 420 and the roller 440 using circulation of water.

Figure 14:
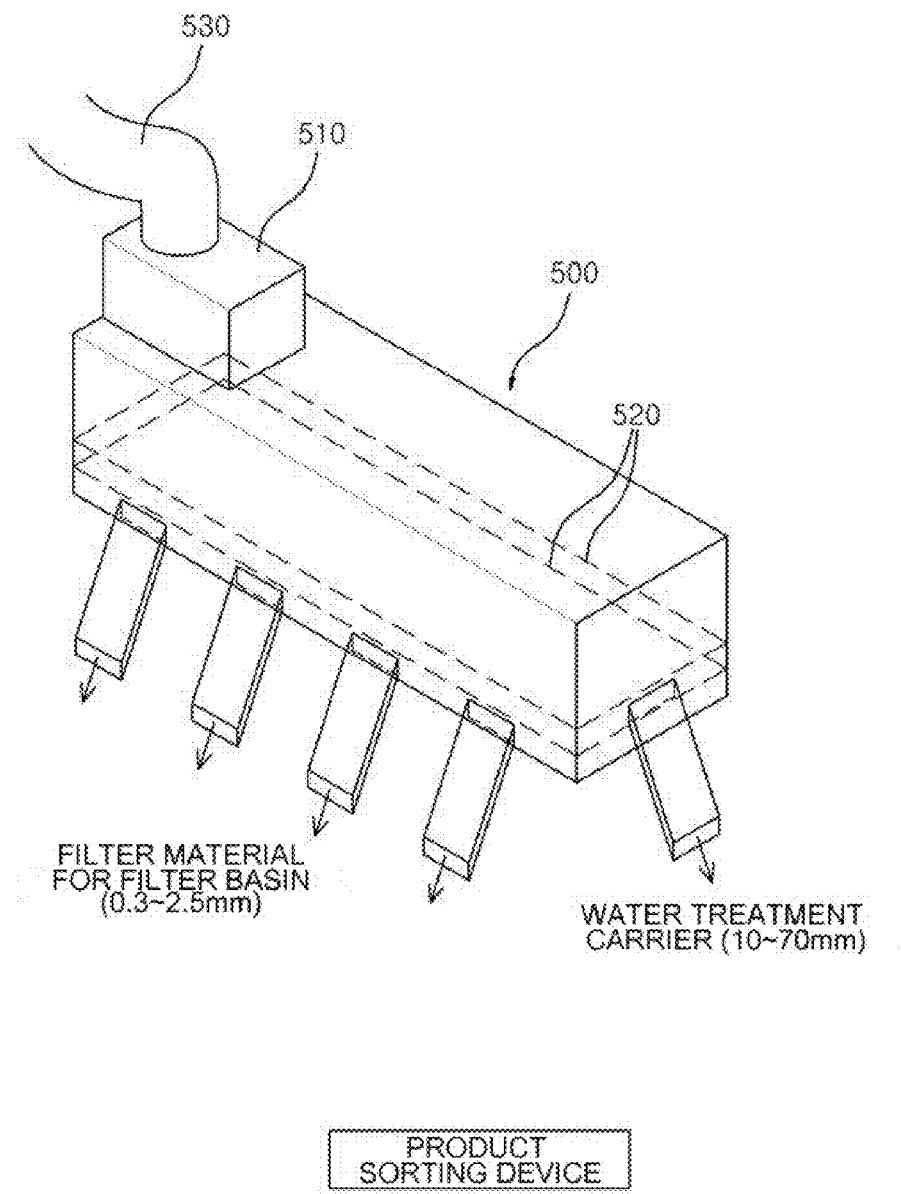
FIG. 14 is an exemplary view illustrating a product sorting device according to the present invention.

As illustrated in FIG. 14, the method further includes, after the foaming and calcination step S400, a packaging step S500 of crushing and pulverizing the artificial filter material 10 to a predetermined size using a crusher 510, and thereafter, sorting and packaging the artificial filter material into respective sizes that are suitable for water treatment via a product sorting device 500.

Here, the product sorting device 500 is provided on one side thereof with a multistage mesh 520 to sort the foamed artificial filter material 10 so that the filter material crushed to a size of 10 mm to 70 mm by the crusher 510 is used as a water treatment carrier, or so that the filter material crushed to a size of 0.3 mm to 2.5 mm is used in a filter basin for treatment of drinking water, graywater, or sewage water. The product sorting device is also provided on the other side thereof with a dust collecting member 530 to collect dust generated during sorting.

Here, the product sorting device 500 includes a conveyor-type transport member, which transports the sorted artificial filter material after the filter material is packaged into a size of 50 liters, 100 liters, or 1000 liters.

Hereinafter, an embodiment of the present invention will be described in more detail.

In the method for manufacturing the expandable floating filter material for water treatment by recycling waste LCD glass and waste bottle glass, the principle of foaming is that, when a foaming agent is added to waste glass powder, the waste glass powder is surrounded by the foaming agent in a soft liquid state, and gas generated via sintering of the foaming agent causes a foam to be swollen, whereby foamed glass is generated as the foam is fixed and stabilized.

The waste LCD glass and the waste bottle glass, which are basic materials used in the present invention, basically have amorphous characteristics, and therefore, are capable of being processed via the same method for manufacturing foamed glass including, for example, pulverization of a raw material, mixing of the raw material and a foaming agent, foaming and calcination, and stabilization.

However, because the properties of glass basically depend on the chemical composition of a raw material, the waste LCD glass and the waste bottle glass, which have different physical and chemical characteristics such as, for example, density, melting point, thermal expansion coefficient, and crystallization temperature, show completely different physical and chemical phenomena during a foaming process. Therefore, the difference in the sizes of powder particles between the waste LCD glass and the waste bottle glass, the mixing ratio of the respective kinds of waste glass, the type of a foaming agent, the foaming and calcination temperature, and the like act as considerably important factors for efficient foaming.

Meanwhile, considering the chemical components of the waste LCD glass and the waste bottle glass, the waste LCD glass basically has the composition of borosilicate glass and contains an excessive amount of $Al_2O_3$, thus having a low thermal expansion coefficient, exhibiting little phase separation or crystallization, and meanwhile exhibiting stronger mechanical characteristics such as hardness, compression strength and bending strength than waste bottle glass. The chemical components of the waste LCD glass are as shown in the following Table 1.

TABLE 1

<Chemical Components of Waste LCD Glass>

| | Item | | | | | | |
|---|---|---|---|---|---|---|---|
| | $SiO_2$ | $Na_2O$ | $K_2O$ | CaO | MgO | $Al_2O_3$ | $Fe_2O_3$ |
| Composition Rate (%) | 64.4 | 0.47 | 0.56 | 4.83 | 1.32 | 16.2 | 0.11 |

| | Item | | | | | | |
|---|---|---|---|---|---|---|---|
| | BaO | $B_2O_3$ | $TiO_2$ | $SrO_2$ | $SnO_2$ | $MoO_3$ | $In_2O_3$ |
| Composition Rate (%) | 6.32 | 3.41 | 0.03 | 1.53 | 0.213 | 0.016 | 0.021 |

In contrast, the waste bottle glass basically has the composition of soda lime glass, thus having a higher thermal expansion coefficient and a lower softening temperature, ultimately resulting in lower chemical durability than the waste LCD glass. The chemical components of the waste bottle glass are as shown in the following Table 2.

TABLE 2

<Chemical Components of Waste Bottle Glass>

| Item | SiO2 | Na2O | K2O | CaO | MgO | Al2O3 | Note |
|---|---|---|---|---|---|---|---|
| Composition Rate (%) | 73.0 | 14.0 | 0.6 | 10.0 | 0.1 | 1.5 | |

Meanwhile, when determining the mixed state of the raw material powder, the particle sizes of the waste LCD glass and the waste glass powder have an effect on the temperature rising time.

Thus, in the present invention, the waste LCD glass is pulverized to a particle size of 40 μm to 100 μm and the waste bottle glass is pulverized to a particle size of 100 μm to 200 μm in a crusher that includes rotors or that is filled with fine media.

At this time, moisture, which has permeated into the waste glass in a hydration process, causes a reduction in the viscosity of a raw material via a nonbridging phenomenon, which has a positive effect on the softening of the waste LCD glass and the waste bottle glass during foaming and calcination.

Here, the percentage of water content is about 1.1% and has an effect on the strength and porosity of the material depending on the weight percent of a foaming agent.

At this time, in consideration of the fact that a foam shows poor swelling and has difficulty in obtaining homogeneous tissues when a foaming agent is sintered before a raw material is softened, in addition to waste LCD glass powder in an amount of 20 to 50 parts by weight, as the foaming agent, calcium carbonate in an amount of 3.0 to 5.0 parts by weight, carbon black in an amount of 0.05 to 2.0 parts by weight, and sodium carbonate in an amount of 2.5 to 6.0 parts by weight are added to 100 parts by weight of the pulverized waste bottle glass powder. When improvement (increase or reinforcement) in the physical characteristics of the artificial filter material is desired via the adjustment of a specific gravity and strength thereof, clay in an amount of 2.0 to 5.0 parts by weight is mixed and hardened so that the density of the pulverized waste bottle glass powder becomes 1.1 g/cm³ to 2.0 g/cm³, and thereafter is pressed and loaded into the continuous furnace 400.

In addition, in the foaming and calcination process, when the raw material powder mixture is introduced in a continuous furnace, it is heated to a high temperature using gas. The furnace is provided with a temperature adjustment device, which may automatically adjust the heating temperature to 650° C. to 1200° C.

Here, when the foaming temperature of the furnace is below 700° C., foaming of the material is not easy due to the low viscosity thereof. When the foaming temperature of the furnace is 1000° C. or more, the formation of pores in the surface of the material is difficult due to the high viscosity thereof. Due to this, the foaming temperature needs to be appropriately maintained depending on the mixture ratio of the respective types of waste glass.

Here, to stabilize the foam immediately after foaming and calcination, the foam may be subjected to stabilization at 400° C. to 500° C., and may then be subjected to annealing, which may remove residual inner stress and prevent the formation of cracks in the foam.

When the foaming and calcination process is completed, the filter material is crushed to a size of 10 mm to 70 mm via the product sorting device. Then, the sorted filter material may be used as a water treatment carrier, or may be used as a filter basin carrier for the treatment of non-point-source pollutants.

Here, when the filter material is used as a filter material for a filtering facility, the filter material is additionally pulverized via a crusher to have a particle size of 0.3 mm to 2.5 mm, a density of 0.3 g/cm³ to 0.7 g/cm³ in a dry state, a density of 1.0 g/cm³ to 1.4 g/cm³ in a water-saturated state, a porosity of 65% to 85%, and a compression strength of 10 kg/cm³ to 30 kg/cm³.

Example 1

Various foreign substances attached to collected waste LCD glass and waste bottle glass are removed using water, air and the like, and are dried. Then, after the glass is crushed to a size of 10 mm to 50 mm, the glass is introduced into a pulverizing device that includes rotors or is filled with fine media and is subjected to hydration for 24 hours or more, whereby powder of the waste LCD glass and the waste bottle glass is obtained. Here, the particle size of the waste LCD glass powder is 50 μm, the particle size of the waste bottle glass powder is 120 μm, and the percentage of water content is 1.0% or more.

The hydrated powder of waste LCD glass and waste bottle glass is made into a raw material powder mixture by adding, as a foaming agent, calcium carbonate in an amount of 1.5 parts by weight and carbon black in an amount of 0.1 parts by weight, and adding the waste LCD glass powder in an amount of 30 parts by weight to 100 parts by weight of the waste bottle glass powder, and mixing the same well.

Then, the raw material powder mixture is hardened to have a density of about 1.5 g/cm³ and is pressed and loaded into a continuous furnace. The temperature inside the furnace is gradually increased by 42° C. per hour until the temperature in the center of the furnace reaches 800° C., and then the raw material powder mixture is foamed in a foaming and calcinations section. Then, after foaming and calcinations, the resulting foam is stabilized to 500° C. in a cooling section and then subjected to annealing immediately so as to remove residual inner stress, whereby a plate-shaped expandable filter material is finally acquired.

TABLE 3

<Comparison of Physical Characteristics of Respective Filter Materials>

| Classification | Density in dry state | Density in water-saturated state | Porosity | Note |
|---|---|---|---|---|
| General farm soil | 1.25 g/cm³ | 4.2 g/cm³ | 52.0% | |
| General sand | 2.65 g/cm³ | 2.9 g/cm³ | 40.0% | |
| Waste bottle glass foam | 0.37 g/cm³ | 1.15 g/cm³ | 75.0% | Compression Strength 20 kg/cm³ |
| Example 1 | 0.37 g/cm³ | 1.1 g/cm³ | 77.0% | Compression Strength 25 kg/cm³ |

As illustrated in the above table, as a result of measuring the acquired expandable filter material, the density in a dry state is 0.35 g/cm³, the density in a water-saturated state is 1.1 g/cm³, the porosity is 77%, and the compression strength is 25 kg/cm³. It can be seen by comparing the physical properties of general soil and general sand with the physical properties of Example 1 that the properties of Example 1 are superior.

In other words, in the situation in which waste LCD glass and broken glass bottles, which correspond to about 50% of the entire output of glass bottles, are pulverized and are reused as a raw material, the present invention provides a method for manufacturing an artificial filter material for water treatment by recycling some of waste LCD glass and waste bottle glass. In the manufacture of an expandable artificial filter material that is used in a process of filtering drinking water, graywater, or sewage water in a highly fine treatment apparatus in order to remove floating materials, solids and the like contained in river water or in sewage water that has been biologically treated in a sewage treatment plant, the manufacturing method includes washing, pulverization, and foaming and calcinations of a raw material that is used for the production of products, and sorting and packaging of products for each particle size or for each product standard depending on water treatment. This method may increase the productivity and quality of products and may realize the recycling of limited available resources.

The present invention is not limited to the specific exemplary embodiment described above, but may be modified in various ways by those of ordinary skill in the art without departing from the subject of the present invention as described in the claims, and these modifications are also within the scope of the claims.

INDUSTRIAL APPLICABILITY

The present invention enables the manufacture of an artificial filter material for water treatment, which is a filtering technique for reducing water pollution. Because the artificial filter material is manufactured via a series of automated processes by recycling waste LCD glass and waste bottle glass via foaming, efficient resource circulation and energy utilization, which are green technologies, may be activated and the discharge of greenhouse gases and pollutants may be minimized, and in conclusion, the present invention is industrially applicable.

The invention claimed is:

1. A method of manufacturing an expandable artificial filter material (10) for water treatment by recycling waste LCD glass generated from waste electric and electronic products and waste bottle glass, the method comprising:

a washing step (S100) of washing collected waste LCD glass (2) and waste bottle glass (1) via a first washing device (100-1) and a second washing device (100) so as to remove foreign substances or dirt;

a pulverizing step (S200) of pulverizing the washed waste LCD glass (2) and waste bottle glass to a set fine particle size via a first pulverizing device (200-1) and a second pulverizing device (200);

a mixing step (S300) of mixing a foaming agent and an additive with powder of the pulverized waste LCD glass (2) and waste bottle glass so that the powder has a set specific gravity, strength and physical properties via a mixing device (300); and a foaming and calcination step (S400) of foaming a raw material powder mixture of the waste LCD glass and waste bottle glass mixed with the foaming agent and the additive while heating the mixture to a temperature via a fire-resistant continuous furnace (400) so as to enable stabilization after foaming and calcination, wherein the expandable artificial filter material (10) has a particle size of 10 mm to 70 mm when used as a water treatment carrier, or a particle size of 0.3 mm to 2.5 mm when used in a filter basin, and also has a density of 0.3 g/cm3 to 0.7 g/cm3 in a dry state, a density of 1.0 g/cm3 to 1.4 g/cm3 in a water-saturated state, a porosity of 65% to 85%, and a compression strength of 10 kg/cm3 to 30 kg/cm3, wherein the first washing device (100-1) includes a water tank (110-1), a water-cooling and air-cooling washer (120-1) provided on one side of the tank, and a dryer (130-1) coupled to a remaining side of the tank and having a drain line (131-1), in order to increase efficiency of removal of various foreign substances or dirt attached and adsorbed to the waste LCD glass, and the second washing device (100) includes a drive unit (110) having a rotatable table (111), a water-cooling and air-cooling washer (120), and a dryer (130) having a drain trap (131), in order to increase efficiency of removal of various foreign substances or dirt attached and adsorbed to the waste bottle glass, wherein the water-cooling and air-cooling washer (120-1) includes a "U"-shaped mesh block inside a hopper and a water-cooling supply pipe provided between the mesh block and the hopper and connected to a water pump and an air compressor, the water-cooling supply pipe being provided with a plurality of branch pipes having spray nozzles so that pressurized water is sprayed in a scattered state onto the waste LCD glass so as to remove stains, and a wash liquid and wash air are supplied to the waste LCD glass at the same time, or are supplied in sequence such that the air is supplied after stains on the waste LCD glass immersed under a level of water in the hopper are soaked, so as to enable washing of pollutants in a bubble-jet or water-jet form, wherein the dryer (130-1) provided at an upper position performs washing using water and then drying using pressurized air when the supplied water is discharged through the drain line (131-1), and the dryer (130-1) is connected to the water pump and the air compressor through a line so as to selectively spray the wash water and the air, wherein the water-cooling and air-cooling washer (120) primarily washes the waste bottle glass using a water pump provided outside a hopper, the water pump selectively supplying cold water in summer or hot water in winter and, depending on setting, the hopper being filled with water to an open upper end thereof so as to allow the waste bottle glass to be immersed in the water so that stains inside and outside the waste bottle glass are soaked, and the water-cooling and air-cooling washer includes a water-cooling supply pipe connected to the water pump and provided with a plurality of branch pipes having spray nozzles so as to enable pressurized washing in a water-jet form, and one side of the water-cooling supply pipe communicates with an air line of an air compressor so that pressurized air is supplied at a predetermined cycle to the water-cooling supply pipe to enable removal of stains via spraying of air bubbles in a bubble-jet form, wherein the rotatable table (111) is rotated in a circumferential direction by the drive unit (110) to assist uniform washing, wherein the dryer (130) is connected to the water pump and the air compressor and is configured to initially spray water from a top to a bottom and, after the water used for washing is completely discharged through the drain trap, again spray rinsing water, and thereafter spray pressurized air from the air compressor so as to enable washing.

2. The method according to claim 1, wherein the first pulverizing device (200-1) includes: a box-shaped frame (210-1) having a waste LCD glass inlet (211-1) formed in one side thereof; a heavy press (220-1) provided in the frame to squeeze and pulverize the plate-shaped washed waste LCD glass (2) to a size of 40 μm to 100 μm via vertical movement thereof relative to the waste LCD glass (2); a dust collector (220-1) provided in the frame (210-1) to collect dust of the waste LCD glass (2) generated during pulverizing; and an anti-noise sound absorber (230-2) coupled to an outer circumferential surface of the frame, and wherein the second pulverizing device (200) includes: a rotor (221) or fine media (222) accommodated in a pulverizing tank (210) to finely pulverize the washed waste bottle glass to a size of 100 μm to 200 μm via rotation thereof; a dust collector (230) formed in one side of the pulverizing tank (210); and an anti-noise sound absorber (240) formed on an outer circumferential surface of the pulverizing tank (210).

3. The method according to claim 1, wherein, in the mixing step (S300), the foaming agent is any one of calcium carbonate, carbon black, and sodium carbonate, or a combination obtained by selective coupling thereof, and the additive is clay or a component having characteristics equivalent to those of clay.

4. The method according to claim 1, wherein, in the mixing step (S300), waste LCD glass powder in an amount of 20 to 50 parts by weight, calcium carbonate in an amount of 3.0 to 5.0 parts by weight, carbon black in an amount of 0.05 to 2.0 parts by weight, and sodium carbonate in an amount of 2.5 to 6.0 parts by weight are added to the pulverized waste bottle glass powder in an amount of 100 parts by weight, and when improvement in a physical property of the artificial filter material is required via adjustment of a specific gravity and strength thereof, clay in an amount of 2.0 to 5.0 parts by weight is mixed and hardened so that the pulverized waste bottle glass powder has a density of 1.1 g/cm3 to 2.0 g/cm3 before the powder is pressed and loaded into the continuous furnace (400).

5. The method according to claim 1, wherein, in the foaming and calcination step (S400), the continuous furnace (400) includes an automatic temperature adjustment device (410), which increases an inner heating temperature to 650° C. to 1200° C. in a set section from an inlet of the furnace, and immediately after foaming and calcination, decreases the temperature to 400° C. to 500° C., so as to enable annealing for stabilization of a foam, removal of a residual inner stress and prevention of cracks.

6. The method according to claim 5, wherein, in the foaming and calcination step (S400), the continuous furnace 400 further includes: a conveyor belt (420) having a speed adjustment device (421) to control a set speed based on the introduced raw material powder mixture of the waste bottle glass, the conveyor belt (420) being formed of a stainless-based metal material having heat resistance; a protective net (430) provided under the conveyor belt (420) to prevent the raw material powder mixture of the waste bottle glass from scattering or dispersing to a floor; a rotation roller (440) formed of titanium or tungsten and configured to drive the conveyor belt (420); and a cooling chamber (450) configured to continuously cool the conveyor belt (420) and the roller (440) using circulation of water.

7. The method according to claim 6, further comprising, after the foaming and calcination step (S400), a packaging step (S500) of crushing and pulverizing the artificial filter material (10) to a size of 10 mm to 70 mm or a size of 0.3 mm to 2.5 mm using a crusher (510), and thereafter, sorting and packaging the artificial filter material into the respective sizes via a product sorting device (500) having a multistage mesh (520).

8. The method according to claim 7, wherein the product sorting device (500) is provided on one side thereof with the multistage mesh (520) to sort the foamed artificial filter material (10) so that the filter material crushed to the size of 10 mm to 70 mm by the crusher (510) is used as a water treatment carrier, or so that the filter material crushed to the size of 0.3 mm to 2.5 mm is used in a filter basin for treatment of drinking water, graywater, or sewage treated water, and is also provided on a remaining side thereof with a dust collecting member (530) to collect dust generated during sorting.

* * * * *